United States Patent [19]
Cox, Jr.

[11] Patent Number: 5,265,415
[45] Date of Patent: Nov. 30, 1993

[54] LIQUID FUEL INJECTION ELEMENTS FOR ROCKET ENGINES

[75] Inventor: George B. Cox, Jr., Tequesta, Fla.

[73] Assignee: The United States of America as represented by the administrator of the National Aeronautics and Space Administration, Washington, D.C.

[21] Appl. No.: 10,037

[22] Filed: Jan. 27, 1993

[51] Int. Cl.$^5$ .............................................. F02K 9/00
[52] U.S. Cl. ........................................ 60/258; 60/741; 137/853; 137/855; 239/410; 239/533.2
[58] Field of Search ................. 60/258, 741; 137/853, 137/855; 239/410, 411, 533.2, 533.3, 570

[56] References Cited

U.S. PATENT DOCUMENTS

| | | | |
|---|---|---|---|
| 3,334,490 | 8/1967 | Hoeptner et al. | 60/258 |
| 3,453,827 | 7/1969 | Vogt | 60/258 |
| 3,742,701 | 7/1973 | Feemster et al. | 60/258 |
| 4,489,750 | 12/1984 | Nehring | 137/853 |
| 4,638,636 | 1/1987 | Cohen | 60/741 |
| 4,696,160 | 9/1987 | Gat | 60/258 |
| 5,014,918 | 5/1991 | Halvorsen | 137/855 |
| 5,054,287 | 10/1991 | Schneider | 60/258 |
| 5,174,504 | 12/1992 | Halvorsen | 239/410 |

FOREIGN PATENT DOCUMENTS 0009708 1/1977 Japan .................................. 60/258

Primary Examiner—Richard A. Bertsch
Assistant Examiner—Howard R. Richman
Attorney, Agent, or Firm—Robert L. Broad, Jr.; Guy M. Miller; John R. Manning

[57] ABSTRACT

Thrust chambers for liquid propellant rocket engines include three principal components. One of these components is an injector which contains a plurality of injection elements to meter the flow of propellants at a predetermined rate, and fuel to oxidizer mixture ratio, to introduce the mixture into the combustion chamber, and to cause them to be atomized within the combustion chamber so that even combustion takes place. Evolving from these injectors are tube injectors. These tube injectors have injection elements for injecting the oxidizer into the combustion chamber. The oxidizer and fuel must be metered at predetermined rates and mixture ratios in order to mix them within the combustion chamber so that combustion takes place smoothly and completely. Hence tube injectors are subject to improvement. An injection element for a liquid propellant rocket engine of the bipropellant type is provided herein which includes tangential fuel metering orifices, and a plurality of oxidizer tube injection elements whose injection tubes are also provided with tangential oxidizer entry slots and internal reed valves.

4 Claims, 3 Drawing Sheets

LIQUID FUEL INJECTION ELEMENTS FOR ROCKET ENGINES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention, in one of its aspects, pertains to thrust chambers of liquid propellant rocket engines, and particularly to liquid bipropellant rocket engines. Bipropellants consist of fuel and oxidizer carried separately in the rocket and brought together in the engine. Thrust chambers for such engines include three principal components, the combustion chamber where rapid high-temperature combustion takes place; the converging-diverging nozzle where the hot reaction gases are accelerated to supersonic velocities; and an injector which contains a plurality of injection elements to meter the flow of propellants at a predetermined rate and fuel to oxidizer mixture ratio, introduce the mixture into the combustion chamber, and cause them to be atomized within the combustion chamber so that combustion takes place evenly.

In a particular aspect, the invention herein pertains to injectors. Through the years a number of injector types have evolved. Impinging spray injectors such as doublet and triplet impinging stream injectors, inject the fuel and oxidizer in intersecting sprays which break up and atomize the feed. The shower head injector sprays propellant into the combustion chamber through concentric rows of holes. There are also self impinging, and non-impinging stream patterns.

Evolving from the spray-type injectors are tube injectors. These tube injectors have injection elements for injecting the oxidizer into the combustion chamber as best understood from FIGS. 1 and 2 in the accompanying drawings. More specifically the invention herein pertains to tube injection elements. One tube injection element is the variable injection area type tube injection element shown in FIG. 1. This tube injection element consists of a tube 2, having a plate 4 covering its end opening into the combustion chamber 6, and a pintle 8 loosely holding the plate to provide for the variable input area. Fuel 10 is admitted through orifice 12 controlled by adjusting sleeve 14.

It will be appreciated that back pressure, although quite difficult to control in the variable area tube injection element 1 shown in FIG. 1, is an essential requirement. If the pressure drop is too low oscillatory combustion will result. In the case of the variable area injection element, either the maximum opening created by plate 4 will be too small and an excessive back pressure will develop, or the minimum opening will be too large and flow will be erratic and oscillatory. This design difficulty led to a tube injection element 20, shown in FIG. 2. This tube injection element has a secondary oxidizer chamber 21 to take care of back pressure. In addition tangential entry slots are provided to swirl the incoming oxidizer.

Referring to FIG. 2, from primary oxidizer chamber 22 oxidizer, by gas pressure or pumps is forced into tube injection element 20 and through tangential orifices (not visible) whose sizes are based on system pressure, and whose appearance is similar to orifices 24 opening into central injection element passageway 26 which is the inner of two concentric passageways. Flow is through an oxidizer manifold, and in response to a computer controlled oxidizer control valve, also not illustrated.

When the pressure increases due to increases in the required engine power level, back pressure is mitigated by shunting oxidizer from primary oxidizer chamber 22 to a secondary oxidizer chamber 21 whose orifices 24 are shown. From the secondary oxidizer chamber, the oxidizer, including that which is bled off, flows into tube injection element 20, being tangentially injected into the inner central passageway 26. There it joins flow from the primary oxidizer chamber 22, whose orifices cannot be seen but which are similar to those in the secondary oxidizer chamber 21.

Concomitantly, from a separate fuel chamber, rocket fuel flows into the outer channel 27 of the two concentric passageways, 26 and 27, also through orifices 25 adapted for tangential oxidizer entry. The spins imparted by the tangential oxidizer orifices cause the fuel and oxidizer streams to meet and mix as they are injected into the combustion chamber 29.

It is to be understood that as in the case of the variable input area injection element, the injection element having primary and secondary oxidizer chambers is also subject to improvement. Throttle range is limited to a maximum value in excess of 10:1. The injection element requires an external flow divider valve and actuator to control the flow split between the primary and secondary chambers. It also requires purges during start-up and shut-down to prevent backflow. The oxidizer and fuel must be metered at predetermined rates and mixture ratios in order to mix within the combustion chamber so that combustion takes place smoothly and completely. Control, thus, is quite demanding using either of the two prior art tube injection elements. By the practice of this invention the problems generated by both of the prior art tube injection elements are overcome. A tube injection element is provided herein which not only eliminates the need for a secondary oxidizer chamber, but permits the use of a smaller oxidizer flow control valve.

SUMMARY OF THE INVENTION

Elements of design of liquid propellant rocket engines include not only the combustion chambers, cooling techniques, and propellant supply systems, but an injection element. An injection element for a liquid propellant rocket engine of the bipropellant type is provided herein. It includes tangential fuel metering orifices, and a plurality of oxidizer tube injection elements whose injection tubes are also provided with tangential oxidizer entry slots. Each oxidizer injection tube contains an internal reed valve biased to permit oxidizer flow therethrough at a minimum flow rate at minimum operating pressures, and to deflect with increasing pressure to maintain a controlled pressure differential across the tube injection element.

DETAILED DESCRIPTION OF THE INVENTION

Rocket engine propellant utilization systems not only ensure that both the fuel and oxidizer tanks are emptied simultaneously, but that the pressure drop across the injection element is optimized. If the pressure drop across the injection element is too great an excessive burden is placed on the propellant supply system. If the pressure drop is too low oscillatory combustion will result. In fact, high speed pressure differentials can destroy a rocket engine. Good injection design reduces the volume and length of a combustion chamber to minimum values. Herein a tube injection element is provided rendering optimization easier to achieve. For a more complete understanding of the invention a preferred tube injection element, a preburner tube injection element, will be described in conjunction with the accompanying drawings.

PREFERRED EMBODIMENT

Figure 3:
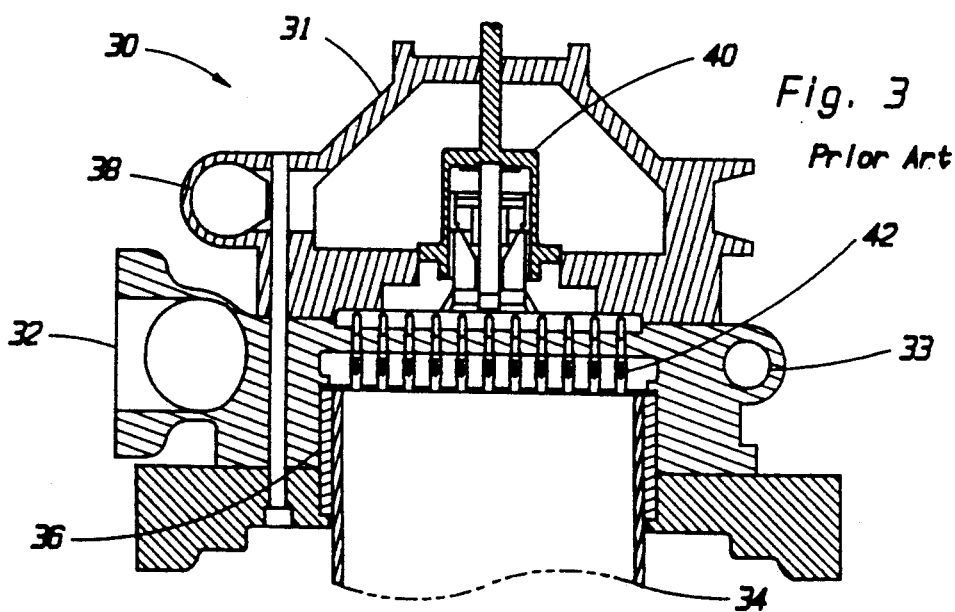
FIG. 3 is a diagrammatic representation of a preburner injection head.

Gases in preburners that drive the turbopumps flow through the injection element into the main combustion chamber and are mixed and burned with the liquid oxygen and gaseous hydrogen supplied to the thrust chamber. This unique flow cycle contributes to the engine's high performance. A typical preburner injection element head 30 is shown in FIG. 3.

The components of the injection element head shown in the figure are an oxidizer flow control valve 31, fuel inlet 32, along with the toroidal fuel manifold 33, and combustion chamber 34 with its transpirationally cooled liner 36.

From oxidizer inlet 38, control mechanism 40 of control valve 31 meters the flow of oxidizer into a plurality, sometimes eighty or more, injection elements 42. A hydraulic, pneumatic, or electrical system is generally used to actuate the principal valves in the engine in response to input from onboard or remote computers. A propellant utilization system ensures that both the fuel tank and the oxidizer tank are emptied simultaneously. This is achieved by continuously measuring the amount of propellant that remains in both tanks. To this end, valve 31 and a throttle valve in the fuel line come into play. Thus, each main engine is controlled by a computer/controller, together with various sensors, valves, and actuators, which generate, but are not limited to generating, such functions flight readiness verification, start and shut down sequencing, closed-loop thrust control and mixture ratio, onboard engine monitoring, and the like.

Figure 4:
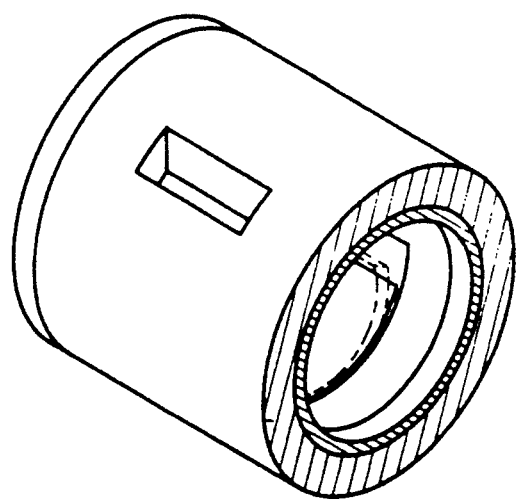
FIG. 4 is an isometric view of the tube injection element of the invention.
Figure 5:
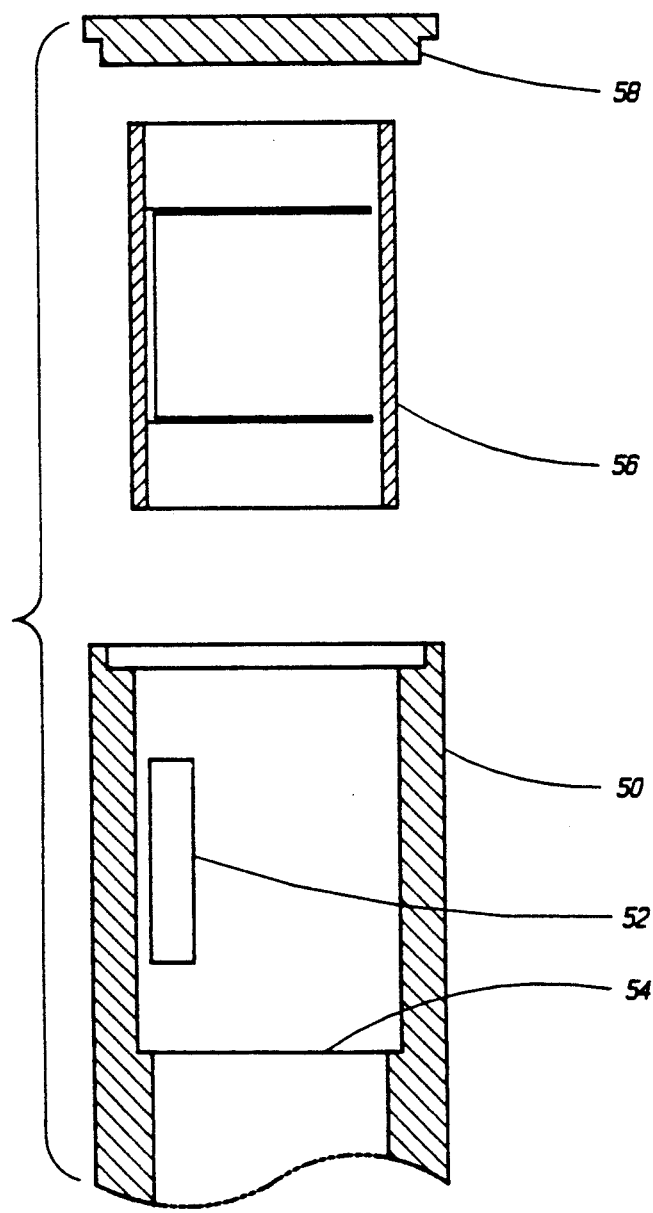
FIG. 5, is an exploded sectional view of the tube injection element of the invention.

Injection elements 42 are the elements of injection element head 30 with which this invention is concerned. This injection element is shown in FIG. 4. Specific characteristics of this injection element are shown FIGS. 5 and 6. The components of each injection element 42 can be readily seen in FIG. 5, which is an exploded view illustrating the tube injection element structure. The injection element includes an injection element tube 50 having tangential oxidizer entry ports or orifices 52, and an internal step or shoulder 54. A reed valve 56 slidably fits in injection element tube 50 and rests in tube 50 so as to be supported on step 54. A cover 58 is welded, brazed, or otherwise permanently secured to the element tube top to close the injection element as can readily be discerned from FIG. 5.

Figure 6:
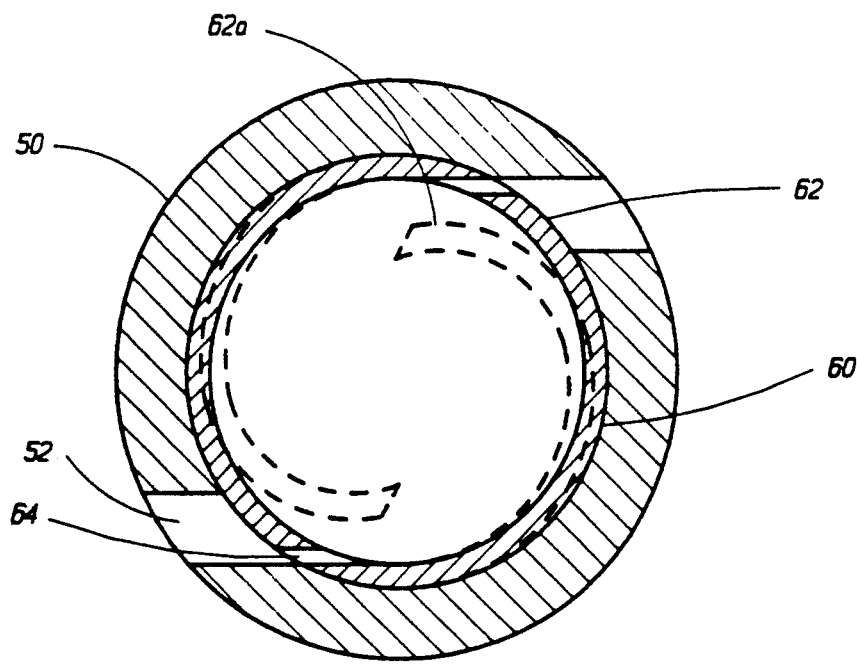
FIG. 6 is a section view through the valve portion of the tube injection element.

The reed valve 56 per se is shown in FIG. 6. That view, a top view with lid 58 removed, shows that the reed valve is a hollow cylinder within tube element 50. The reed valve includes this thin-walled cylinder 60, and resilient cut out reeds 62. Valve openings 64 opposite tangential orifices 52 each provide a fixed minimum flow area whose size will depend upon design characteristics.

In operation, oxidizer flows into the injection element through tangential orifices 52, and forces reeds 62 to deflect to the position 62a, shown by the dashed lines in FIG. 6. At low oxidizer pressure the reeds remain in the undeflected position 62 shown in FIG. 6. They stay in that position until a predetermined increase in pressure is attained. At higher oxidizer pressures the reeds deflect to a maximum opening, the positions 62a shown seen as dashed lines in FIG. 6. At this point further increases in oxidizer pressure produce no further increase in reed deflection. The metering area defined by the ends of reeds 62a becomes the area of tangential slots 52 themselves.

Figure 7:
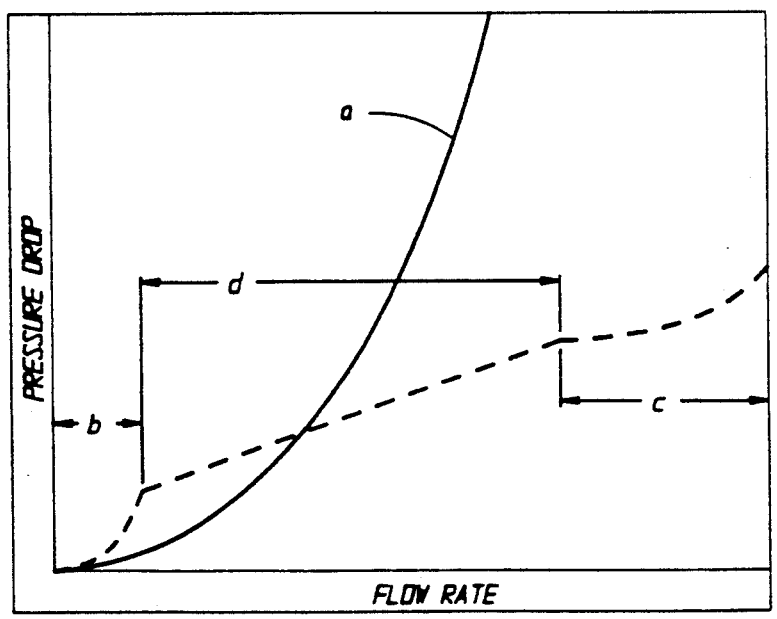
FIG. 7 is a pressure drop diagram.

The characteristic pressure drop versus flow for a fixed flow area and the reed valve herein are compared in FIG. 7. The solid curve shows pressure drop versus flow rate for a fixed flow area, demonstrating that pressure drop increases as the square of the flow rate a. For the reed valve of the invention the pressure drop is a squared function of the flow rate over the initial, b, and final, c, portions of the flow curve, and a linear function of flow d during the portion of the flow curve during which the reeds are in motion. The reed valve thus leads to a variation of the flow area of the tangential orifice in response to the pressure of the system. Reed resilience is biased to permit minimum flow based on design considerations so that the engine is not unstable, and to permit a deflection based on operating pressures to maintain a constant pressure differential across the tube injection element so that backflow is minimized. In other words the reed valve is calibrated to yield the desired relationship between flow rate and pressure differential.

Figure 1:
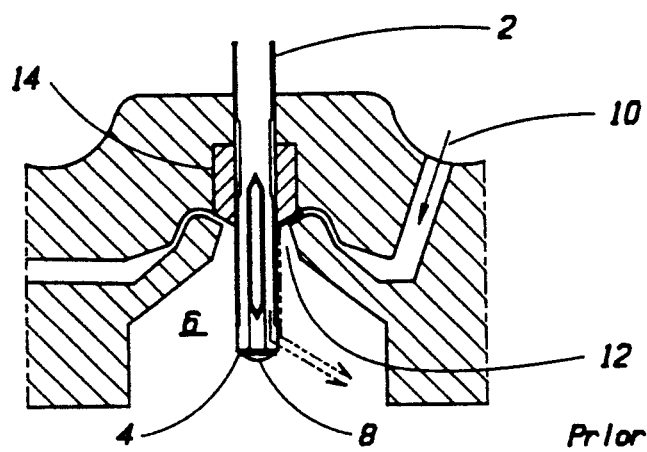
FIG. 1 is a cross sectional view of a prior art variable injection element area concentric tube injection element hereinbefore described.
Figure 2:
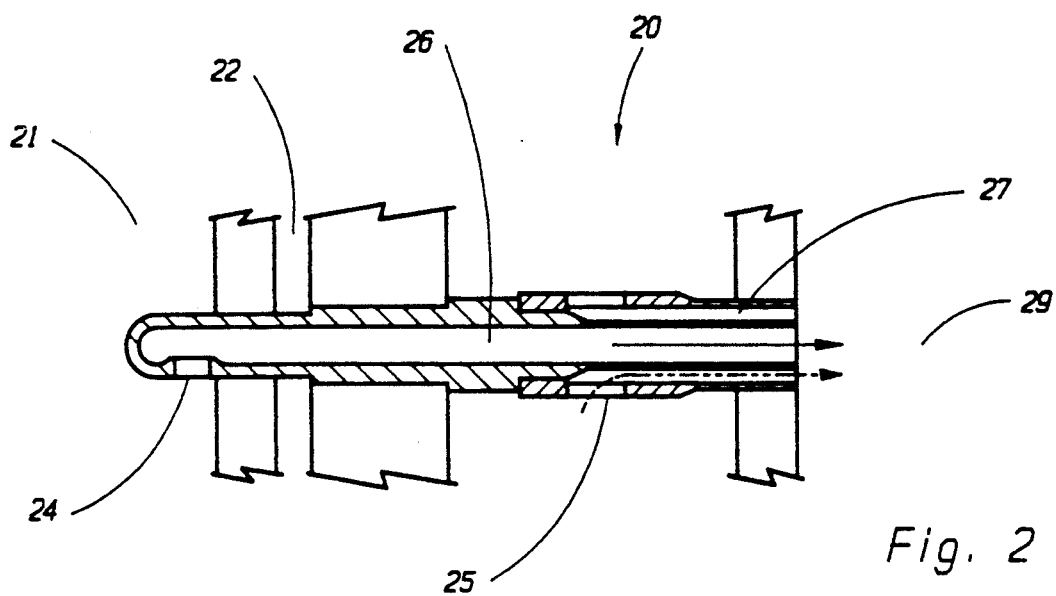
FIG. 2 is a diagrammatic view of a prior art tube injection element having primary and secondary oxidizer injection means, also described hereinbefore.

It can be seen that the liquid propellant injection element of this invention incorporates both the tangential entry feature of prior art injection elements (FIG. 2), and variable geometry for wide throttle range capability. The variable geometry aspect is introduced through the unique inclusion of a reed valve. More important, the injection element of this invention eliminates the secondary chamber described in the prior art injection element described in conjunction with FIG. 2. In addition, as indicated, the oxidizer flow control valve (31 in FIG. 3) can be much smaller, lighter, and simpler. And the injection element permits a greater flow without an excessive pressure drop.

In the light of the teachings of this invention, variations and ramifications will occur to those skilled in the art. Thus while the reeds have been described as having been cut out herein they can be resilient blades otherwise attached to an internal element. As another example, the size of the injection element, the reed spring bias, and the details of containing the reed valve internally within an outer tube element can be different. The injection element can take various forms, the cylindrical form being preferred herein because it can be used in the preburner injection element head 30 conventionally employed. By the same token the specific oxidizers and fuels are subject to variation. Various fuels and combinations of fuels such as hydrogen, hydrogen-fluorine, hydrogen-oxygen, nitrogen tetroxide, nitrogen-tetroxide-hydrazine and the like can be used in the injection element of the invention. Further, even though the invention has been exemplified in conjunction with a fuel preburner injection element, the injection element of this invention can be employed in gas generators, main combustion chambers, and in any rocket engine wherein injection elements are used, such as conventional rocket engines and turborockets. In addition in some of these engines only one reed valve need be utilized. These and other modifications are deemed to be within the scope of this invention.

What is claimed is:

1. An injector for a liquid propellant rocket engine of the type including a plurality of tube injection elements whose injection tubes are provided with tangential propellant entry slots, wherein each injection tube contains an internal reed valve adapted to permit flow therethrough at a minimum flow rate at minimum operating pressures, and biased to deflect with increasing pressure to maintain a controlled pressure differential across the tube injection element, wherein the injection element tube is provided with an inner cylindrical recess and a cover therefor, wherein the reed valve is in the form of a cylinder fitting slidably within the inner recess with the cover in place, and wherein the cylinder has a portion of its wall cut to form a reed for the reed valve.

2. In an injector for a liquid propellant rocket engine of the type having a plurality of tube injection elements provided with tangential entry slots, the improvement which minimizes oscillatory combustion wherein each tube injection element contains an internal reed valve having a resilient reed opposite each entry slot adapted when undeflected to provide fixed flow area in the entry slot allowing flow therethrough at a minimum flow rate at minimum operating pressures, and wherein the reed is biased to deflect away from the entry slot with increasing pressure to maintain a controlled pressure differential across the tube injection element so tat said oscillatory combustion is minimized.

3. The injection element of claim 2 wherein each injection element tube is provided with two tangential entry slots and two thin walled reed valves cooperating therewith.

4. A tube injection element for metering propellant into a rocket engine combustion chamber, the injection element comprising an outer tube having a tangential entry slot therein, and an inner cylindrical reed valve fitting slidably in the outer tube, the reed valve being disposed in the outer tube with its reed opposite the entry slot in the outer tube, but only partially closing said entry slot to allow flow therethrough at a minimum predetermined flow rate, the reed being biased to deflect with increasing pressure to maintain a controlled pressure differential across the entry slot.

* * * * *